2,973,286

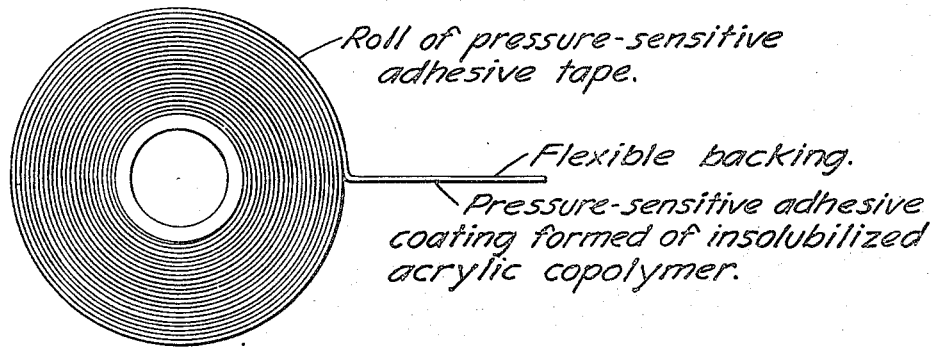

SOLVENT-RESISTANT PRESSURE-SENSITIVE POLYACRYLIC ADHESIVE TAPE AND METHOD OF PREPARING SAME

Erwin W. Ulrich, Rosemount, Minn., assignor to Minnesota Mining and Manufacturing Company, St. Paul, Minn., a corporation of Delaware Filed Mar. 30, 1956, Ser. No. 575,199

6 Claims. (Cl. 117—122)

This invention relates to flexible backing members having solvent-resistant, normally tacky and pressure-sensitive adhesive coatings and to the method of providing flexible backing members with a solvent-resistant pressure-sensitive adhesive coating. In particular the invention relates to adhesive tapes having flexible backings coated with insolubilized acrylate copolymer pressure-sensitive adhesives.

Normally tacky and pressure-sensitive adhesive tapes are widely used for a variety of sealing, holding, fastening, mending and masking purposes. However, pressure-sensitive adhesives are for the most part highly sensitive to organic fluids and have been little used where they might be exposed to solvent attack, necessitating the use of tied cord or fabric wrappings, water-activated gummed tapes, and other inconvenient and undesirable substitutes. In applications for which substitutes are entirely unsuited, the pressure-sensitive adhesive may be protected to a certain extent from solvent attack through the use of solvent-repellent backing. For example, masking tape may utilize as a backing aluminum foil or porous paper saturated with a solvent resistant latex or the like. Since paints or lacquers sometimes creep under the edges of the tape to attack the pressure-sensitive adhesive, such tapes are not entirely satisfactory.

A few pressure-sensitive adhesives are resistant to limited classes of solvents, but for the most part such adhesives are deficient in one or more respects, for example in their ability to adhere to surfaces which are slightly greasy or otherwise somewhat unclean. In any event, it is believed that no pressure-sensitive adhesive heretofore known exhibits general solvent resistance.

A class of pressure-sensitive adhesives which possesses unusually good resistance to aging, particularly in its resistance to the effects of sunlight and oxygen or ozone, consists of copolymers of (a) monomeric acrylic acid ester of non-tertiary alkyl alcohol and (b) acrylic acid or its equivalent. In addition to good age-resistance, these adhesives adhere firmly to a large variety of surfaces under minimum fingertip pressure. However, these pressure-sensitive adhesives have limited resistance to organic solvents and cannot be used in many cases where the danger of contact with solvent exists.

I have now discovered a class of pressure-sensitive adhesive coatings which are substantially insoluble in and resistant to all common organic solvents and yet are high in cohesive or internal strength while retaining considerable stickiness or tackiness so that they may be adherently attached to any surface to which ordinary pressure-sensitive adhesive coatings may be adhered. These adhesive coatings possess exceptionally good aging properties and are particularly well suited to applications where a high degree of permanence is required.

These novel insoluble but highly tacky pressure-sensitive adhesive products are obtained, in accordance with the present invention, from copolymers of (a) certain monomeric acrylic acid esters of non-tertiary alkyl alcohol and (b) small proportions of certain copolymerizable monomers as hereinafter defined by heating such acrylate copolymer with small proportions of benzoyl peroxide or other organic peroxide soluble in the copolymer.

Organic peroxides customarily serve as catalysts for the polymerization of vinyl type monomers, and in fact are advantageously thus employed in producing the acrylate copolymers used in the present invention. The reaction mechanism is understood to involve free radical reaction at the vinyl double bonds. The amount of peroxide catalyst must be restricted, since increased amounts cause reduction in the molecular weight of the polymeric product. The vinyl double bonds are eliminated during polymerization.

The effect of additional amounts of organic peroxide in increasing the molecular weight and solvent resistance of the saturated acrylate copolymer is thus entirely unexpected. Furthermore it could not be expected that any mechanism causing increased solvent resistance would not simultaneously greatly reduce the tackiness of the acrylate copolymer. Nevertheless, by employing the materials and methods above indicated, there are obtained novel and highly useful acrylate copolymer pressure-sensitive adhesive coatings having a high degree of tackiness, having good resistance to softening at elevated temperatures, and being substantially insoluble in and resistant to all common organic solvents including aliphatic and aromatic hydrocarbons, alcohols, ketones and esters and mixtures thereof. In addition, these novel pressure-sensitive adhesive coatings possess excellent resistance to shear forces and are substantially improved in this respect over soluble acrylate copolymer pressure-sensitive adhesive coatings, although the latter are also characterized by good shear properties.

While the novel adhesive coatings of this invention may swell somewhat on contact with such solvents, they remain eucohesive, i.e., more cohesive than adhesive, so that tapes provided with such coatings can be unwound from roll form, handled with the fingers, and stripped from smooth surfaces while wet with solvent without offsetting of adhesive. Upon drying, the novel pressure-sensitive adhesive tapes are for the most part equal in quality to adhesive tapes not exposed to solvent, even though held in contact with solvent for extended periods.

Reactions between the acrylate copolymers and soluble organic peroxides is completed under surprisingly moderate conditions. The reaction is conveniently effected as soon as the solvent is evaporated from the adhesive layer so that these two operations are essentially performed in a single step and in a time and at a temperature not greatly exceeding usual requirements for simply drying a coating.

The invention will now be further illustrated by the following examples, in which all parts are by weight, without intent to be limited thereto.

Example I

Two hundred and eighty-five parts by weight of isoamyl acrylate monomer was copolymerized with 15 parts of acrylic acid in solution in 700 parts of ethyl acetate solvent, using 2 parts of benzoyl peroxide as catalyst. The solution was held at 60° C. for 5 hours until polymerization was largely completed, then at about 70° C. for 1 hour, to provide a viscous solution containing about 30 percent nonvolatiles. It was cooled to room temperature and diluted to 20–25% nonvolatiles with heptane to provide a product which is referred to hereinafter as product A.

When product A was coated in a thin layer on transparent cellophane film, which had previously been provided with a low adhesion backsize and dried for 15 minutes at 220° F., a long-aging transparent pressure-sensitive adhesive tape was produced which could be securely adhered to kraft paper or hard surfaces under light and quick fingertip pressure to remain permanently bonded thereto, although the tape could be removed from a hard, smooth surface without undergoing delamination or splitting of the adhesive layer. However, when a cotton swab soaked in toluene was placed against the adhesive side of the tape, the adhesive immediately partially dissolved, and when the swab was withdrawn, the adhesive was drawn out into strings.

To a batch of product A was added a further 1.5% of benzoyl peroxide based on the weight of solids, and this blend was coated in a thin layer on the cellophane film. The coated film was then held in an air-circulating oven for 15 minutes at 220° F. to provide a solvent-resistant transparent pressure-sensitive adhesive tape as evidenced by the fact that swabbing of the adhesive layer with absorbent cotton soaked in toluene caused the adhesive to swell slightly but produced no dissolution or stringing. After evaporation of the toluene, the adhesive tape was found to be of substantially equal quality to tape not subjected to the toluene. The insolubilized adhesive tapes also showed adhesion to kraft paper and other surfaces virtually equal to that of the solvent-susceptible tapes prepared from the unmodified product A. Properties of resistance to aging including resistance to sunlight and oxygen were also retained.

Substantially equivalent resistance was noted in regard to a number of other solvents including ethyl acetate, carbon tetrachloride, and heptane.

A portion of product A was coated on porous creped kraft paper at a thickness sufficient both to saturate the paper and to leave, after drying for 5 minutes at 155° F., a layer of pressure-sensitive adhesive. A strip of this pressure-sensitive adhesive tape was adhered to a clean plate of glass which was then immersed in toluene. Within 5 minutes, the tape fell from the glass.

A similar pressure-sensitive adhesive tape was prepared with the blend of product A and benzoyl peroxide except that the coated kraft paper was held at 220° F. for 15 minutes to react the ingredients. This tape remained firmly adhered to a glass plate after more than 24 hours immersion in toluene.

*Example II*

A mixture of 104 parts by weight of distilled water, 8 parts of a 28% solution of alkylated aryl polyether sodium sulfonate ("Triton X-200"), 95.5 parts of isooctyl acrylate, 4.5 parts of acrylic acid, and 0.08 part of tertiary dodecyl mercaptan was purged well with nitrogen and brought to 30° C. with agitation. There was then added 0.2 part of potassium persulfate and 0.067 part of sodium bisulfite. Polymerization proceeded rapidly with evolution of heat. The polymer was recovered from the emulsion, dried and dissolved in a mixture of 80 parts heptane and 20 parts propyl alcohol to a coatable viscosity to provide a product referred to herein as product B.

Product B was coated in a thin layer on transparent cellophane film having a low adhesion backsize and dried at 220° F. for 15 minutes to provide transparent pressure-sensitive adhesive tape of excellent quality, save for the relatively poor resistance of its adhesive to solvents.

Another batch of product B was mixed with 1.5% of cumene hydroperoxide based on solids weight, and the mixture was coated in a thin layer on the cellophane film and then heated for 15 minutes at 220° F. to insolubilize the adhesive. This tape product possessed virtually identical qualities of adhesion, cohesion, stretchiness and elasticity as compared to that obtained with unmodified product B and in addition exhibited good resistance to the organic solvents listed in Example I.

*Example III*

A pressure-sensitive adhesive tape was prepared by coating the copolymer of 96.3 parts of isooctyl acrylate and 3.7 parts of acrylamide on backsized cellophane film following the procedure outlined in Example I.

A second adhesive tape was prepared by the same procedure and with the same materials except that 1.5% benzoyl peroxide based on total solids was added to the coating solution.

These adhesive tapes after being dried at 220° F. for 15 minutes were tested for resistance to the solvents used in Example I by wiping each with swabs soaked with such solvents. The adhesive of the first tape showed only slight solvent-resistance and was drawn out into strings when the swabs were drawn away whereas the heat-reacted product of the acrylate copolymer and benzoyl peroxide showed good resistance to these solvents.

*Example IV*

Pressure-sensitive adhesive tapes prepared with the copolymer of 95 parts n-decyl acrylate and 5 parts acrylic acid as in Example I, one with and one without an added 1.5% benzoyl peroxide, were tested with the organic solvents listed in Example I. The adhesive of the tape containing the peroxide-reacted adhesive was found to be substantially resistant to the solvents while the other adhesive was not.

*Example V*

A copolymer of 90 parts of commercial fusel oil acrylate with 10 parts of acrylic acid was prepared by the methods of Example I, and 3% of cumene hydroperoxide was added to the coating solution. On coating on backsized cellophane and curing for 15 minutes at 220° F., the resultant adhesive had excellent properties, and was not affected by methyl ethyl ketone when subjected to the solvent-resistance test described in Example I. To the opposite effect, a control sample prepared without the cumene hydroperoxide was to a large extent soluble in the same solvent.

Commercial fusel oil has a variable composition lying within the approximate limits of 55–80% primary amyl alcohols, 15–45% primary butyl alcohols, and 0–5% n-propyl alcohol, as determined by analysis, and the fusel oil acrylate ester as used in this example is a mixture of the acrylic acid esters of these alcohols within the proportions given and having an average of slightly more than four carbon atoms per alcohol alkyl group. At least one-half of the carbon atoms of the alkyl groups of the ester molecules are in a straight chain terminating at the hydroxyl oxygen atom, a major proportion of such chains containing at least four carbon atoms.

*Example VI*

The time required to effect a reaction between the acrylate copolymer and organic peroxide may be shortened by means of increasing the temperature. A solution of the copolymer of 95 parts fusel oil acrylate and 5 parts of acrylic acid, which copolymer had a viscosity of 95 centipoises at 77° F. and 37.8% solids with 2½% benzoyl peroxide based on the weight of the copolymer was coated on porous creped kraft paper at a thickness sufficient both to saturate the paper and to provide a pressure-sensitive adhesive layer after evaporation of solvent. This adhesive was reacted to a substantially solvent-resistant, pressure-sensitive state in only 2 minutes at 350° F.

A strip of this pressure-sensitive adhesive tape was pressed into full contact with a clean aluminum plate which was then placed in an oven for one hour at 350° F. The strip was then removed cleanly at this temperature without delamination or offsetting of adhesive. In contrast, tapes of soluble acrylate copolymer pressure-sensitive adhesives experience complete offsetting of the adhesive layer in this test.

In preparing the adhesive tape or coated adhesive sheet materials of this invention, any of the commonly employed flexible backings and any of the adhesive priming coatings, backsizings, and the like may be utilized as will be appreciated by those skilled in the adhesive tape art. Likewise, pigments and other modifiers may be added to the adhesive compositions where opacity, color, increased firmness, or other effects are desired. However, where it is intended to use the tape product under conditions of exposure to certain fluids, the backing and primer coating must also be resistant to such fluids. Particularly useful in respect to its resistance to solvents is film prepared from high molecular weight polyester of ethylene glycol and terephthalic acid which is presently available in tensilized film form under the designation "Mylar."

Useful pressure-sensitive adhesive tapes may be prepared in accord with this invention using a large number of acrylate copolymers in addition to the specific copolymers described above. For example, the copolymers may be prepared with monomeric acrylic acid esters of non-tertiary alkyl alcohol of varying chain length including methyl, ethyl and propyl acrylates as well as longer chain esters such as tetradecyl acrylates, including both primary and secondary, normal and branched chain alkyl esters. The esters of tertiary alkyl alcohols do not provide the required stickiness and other properties, either in the copolymers obtained therewith or in the reaction products of such copolymers and organic peroxides, and are excluded. For the same reason, highly branched alkyl chains in which the side chains account for more than about one-half the total number of carbon atoms in the molecule are also excluded. It is also necessary that the acrylic acid ester component contain at least a major proportion of esters having an alkyl chain length of at least four carbon atoms, and that the total number of carbon atoms in the average alkyl group be within the range of about 4–12 carbon atoms.

A seeming exception to these requirements is the acrylic acid ester of pentanol-3. This secondary alcohol has an alkyl skeletal chain length of only three carbon atoms but provide an acrylate homopolymer, as well as an acrylate copolymer with small amounts of acrylic acid or the like, which is useful as a normally tacky and pressure-sensitive tape adhesive and can be reacted with soluble organic peroxides to provide insoluble pressure-sensitive adhesive coatings in accordance with the teachings of this invention. While this ester is contemplated as being an equivalent of those above-identified, it is relatively very difficult to prepare by direct esterification of the sec-amyl alcohol with acrylic acid and is therefore not presently preferred.

The monomeric acrylic acid esters of non-tertiary alkyl alcohol or mixtures as above identified may be copolymerized with monomers other than those utilized in the examples. Additive monomers which are useful in providing acrylate copolymers which may be insolubilized by reaction with soluble organic peroxides include acrylic acid, methacrylic acid, acrylamide, methacrylamide and itaconic acid.

Commercially useful pressure-sensitive adhesive tapes can be obtained in the practice of this invention using copolymers of (a) monomeric acrylic acid esters of non-tertiary alkyl alcohol and (b) additive copolymerizable monoethylenic monomers containing, bonded to an ethylenic carbon, at least one strongly polar group attached through a carbonyl radical, in which copolymers the proportion of such additive monomer comprises about 2–12 percent of the weight. The useful range of additive monomer extends to lower proportions than are suitable if the acrylate copolymer itself must serve as the pressure-sensitive adhesive in that reaction with organic peroxide makes the adhesive somewhat more firm. However, if the acrylate copolymer includes less than about 2 percent additive monomer, reaction with organic peroxide is found to be unduly slow; the reaction product is somewhat weaker cohesively than is desirable; and the reaction product is less resistant to, although still insoluble in, organic solvents having a greater tendency to swell. Above about 12–15 percent of additive monomer, the copolymer-peroxide reaction product becomes too firm and hard for best application as a normally tacky pressure-sensitive adhesive. Particularly preferred are tape adhesives produced with about 4–10% additive monomer, within which range optimum reaction speed, solvent resistance, tackiness and other properties are obtained.

While the monomeric acrylic acid esters of non-tertiary alkyl alcohol will normally be copolymerized only with one or more of the additive copolymerizable monomers, small amounts of other monomers may unavoidably be associated with these monomers, or may even be deliberately added, without detracting from the ability of the resulting acrylate copolymer to provide insoluble pressure-sensitive adhesive coatings upon reaction with organic peroxides. The inclusion of copolymerizable ethylenically unsaturated monomers such as ethyl acrylate, vinyl chloride, various methacrylate esters, butadiene, isoprene, diallyl phthalate, etc., in such limited amounts as do not drastically alter the properties of the acrylate copolymer, is therefore to be considered as coming within the scope of the present invention.

Insoluble pressure-sensitive tape adhesive coatings have been prepared in accordance with this invention by using from 1 to 6 percent based on the weight of the acrylate copolymer, of an organic peroxide which is soluble in such acrylate copolymer. Amounts less than about 1 percent require unreasonably long heating to effect the insolubilizing reaction. Reaction mixtures including more than about 6 percent peroxide are thought to be potentially dangerous and are not preferred. Increased amounts above about 3–4 percent peroxide do not appreciably speed the reaction nor do they improve the reaction product.

Solvent-resistant pressure-sensitive adhesive tapes have considerable commercial significance, for example, as electrical insulating tapes where contact may be had with transformer oil or the like and for holding, insulating or identifying purposes in automobiles and airplanes, where possible contact with fuel, hydraulic fluid, lubricant, etc., is foreseen.

The novel adhesive coatings of this invention serve useful purposes in addition to providing pressure-sensitive adhesive tapes. For example, an unreacted, solvent-containing mixture of acrylate copolymer and peroxide can be used to saturate paper and then heated to drive off the solvent and to react the peroxide with the acrylate copolymer. The paper may be then provided with a non-tacky surface coating such as methacrylate lacquer to provide a reinforced solvent- and weather-resistant paper suitable for use in outdoor posters or as identification tags in areas likely to be exposed to various solvents.

In such use it is preferred to use acrylate copolymers of relatively low viscosity, i.e., copolymers which may be characterized as viscous liquids, in that the use of lower viscosity polymers allows a reduction in the percentage of solvent and a corresponding increase in saturation of the paper or other material being reinforced as well as a lessening in the time required for drying. In addition, lower weight acrylate polymers are easier and more economical to prepare.

The novel adhesive coatings of the invention may unify and lend solvent-resistance to unwoven fibrous sheet material commonly used as the flexible backing of masking tape, e.g., "Duracel" crepe paper, a purified kraft towelling type of paper sold by Brown Co., Berlin, N.H. The same composition used to saturate the backing can simultaneously be applied in excess to one side of the backing to provide a pressure-sensitive adhesive masking tape in a single coating and baking operation. The reverse side is then provided with a non-tacky solvent-resistant coating, preferably a coating which will serve as a low adhesion backsize to more readily allow the tape to be unwound from roll form without the use of a liner. The copolymer of 60 parts of octadecyl acrylate and 40 parts of acrylic acid is an example of such a coating. The need for low adhesion backsizes or low-adhesion liners with the novel pressure-sensitive adhesive tapes depends to a large extent on the specific adhesive formulation, since relatively large percentages of acrylic acid or other additive monomer, e.g., about 6-12 percent of total monomer in the acrylate copolymer, provide adhesives which tend to become tenaciously bonded to another surface on prolonged contact therewith, while adhesives produced with smaller percentages of additive monomer are more easily removed.

The attached drawing shows a roll of pressure-sensitive adhesive tape wound directly upon itself. The tape is provided with a normally tacky and pressure-sensitive adhesive coating prepared in accordance with the principles of this invention and consisting essentially of the product produced by heating together a copolymer of (a) monomeric acrylic acid ester of non-tertiary alkyl alcohol and (b) acrylic acid or equivalent additive monomer as hereinbefore identified, and a significant small proportion of an organic peroxide soluble in the acrylate copolymer. The tape is wound so that the adhesive coating is on the inside.

I claim:

1. A solvent-resistant flexible backing member having a normally tacky and pressure-sensitive adhesive coating comprising the solvent-resistant heat-reaction product of (1) a copolymer of monomers comprising (a) monomeric acrylic acid ester of non-tertiary alkyl alcohol, the molecules of which have from 1 to 14 carbon atoms, the average being about 4-12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky stretchable and elastic adhesive polymer mass, and (b) at least one copolymerizable monoethylenic monomer containing, bonded to an ethylenic carbon, at least one strongly polar group attached through a carbonyl radical, the total copolymerizable monomer (b) comprising about 2-12 percent by weight of the total of said monomers (a) and (b); and (2) an organic peroxide soluble in the said copolymer and in an amount within the range of about 1-6 percent by weight of said copolymer.

2. A flexible backing member having a normally tacky and pressure-sensitive adhesive coating as defined in claim 1 wherein the copolymerizable monoethylenic monomer (b) is acrylic acid and comprises about 4-10 percent of the total of said monomers (a) and (b).

3. The method of providing a flexible backing member with a solvent resistant, normally tacky and pressure-sensitive adhesive coating consisting essentially of the steps of (1) blending together components consisting essentially of 100 parts of an acrylate polymer and about 1-6 parts of an organic peroxide soluble in said polymer, the said polymer being a copolymer of monomers comprising (a) monomeric acrylic acid ester of non-tertiary alkyl alcohol, the molecules of which have from 1 to 14 carbon atoms, the average being about 4-12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky stretchable and elastic adhesive polymer mass, and (b) at least one copolymerizable monoethylenic monomer containing, bonded to an ethylenic carbon, at least one strongly polar group attached through a carbonyl radical, in an amount by weight within the range of about 2-12 percent of the total of said monomers (a) and (b), (2) applying a thin coating of the blend to a surface of said flexible backing member, and (3) heating the coating at a temperature and for a time sufficient to complete the reaction.

4. Normally tacky and pressure-sensitive adhesive sheet material comprising a flexible backing member having a coating of the reaction product of (1) a copolymer of monomers consisting essentially of about 90 parts of the acrylic acid ester of fusel oil and about 10 parts of weight of acrylic acid and (2) about 1.5 parts, per 100 parts of said copolymer, of benzoyl peroxide.

5. Normally tacky and pressure-sensitive adhesive sheet material comprising a flexible backing member having a coating of the reaction product of (1) a copolymer of monomers consisting essentially of about 90 parts of isoamyl acrylate and about 10 parts by weight of acrylic acid and (2) about 1.5 parts, per 100 parts of said copolymer, of benzoyl peroxide.

6. Normally tacky and pressure-sensitive adhesive sheet material comprising a flexible backing member having a coating of the reaction product of (1) a copolymer of monomers consisting essentially of about 95 parts of isooctyl acrylate and about 5 parts by weight of acrylic acid and (2) about 1.5 parts, per 100 parts of said copolymer, of benzoyl peroxide.

References Cited in the file of this patent

UNITED STATES PATENTS

| 2,249,498 | Schulze | July 15, 1941 |
| 2,607,711 | Hendricks | Aug. 19, 1952 |
| 2,628,214 | Pinkney et al. | Feb. 10, 1953 |

FOREIGN PATENTS

| 481,508 | Canada | Mar. 4, 1952 |